No. 632,869. Patented Sept. 12, 1899.
R. C. HARRIS.
THREE HORSE EVENER.
(Application filed Jan. 29, 1898.)
(No Model.)
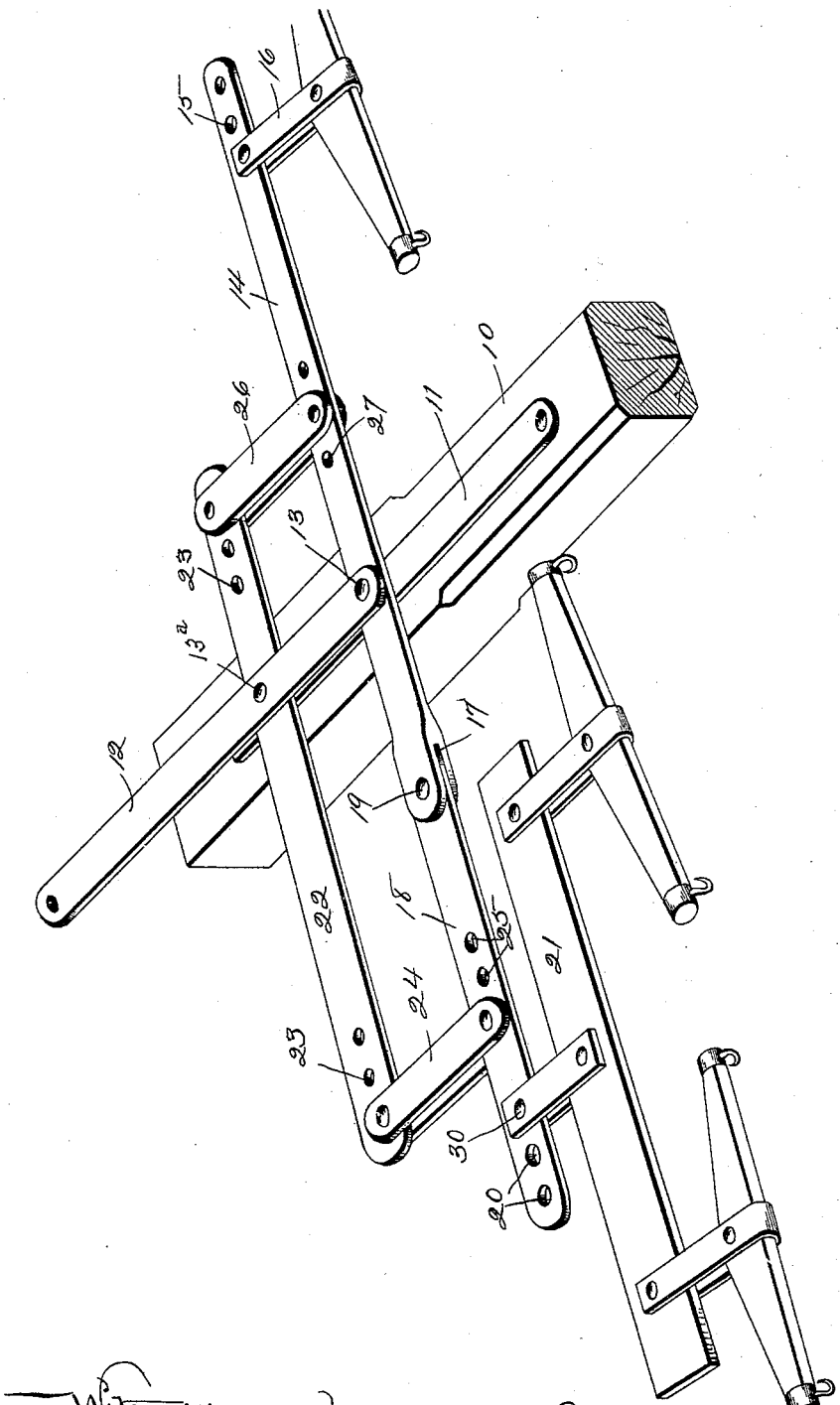

UNITED STATES PATENT OFFICE.

ROBERT C. HARRIS, OF OSKALOOSA, IOWA.

THREE-HORSE EVENER.

SPECIFICATION forming part of Letters Patent No. 632,869, dated September 12, 1899.

Application filed January 29, 1898. Serial No. 668,513. (No model.)

*To all whom it may concern:*

Be it known that I, ROBERT C. HARRIS, a citizen of the United States, residing at Oskaloosa, in the county of Mahaska and State of Iowa, have invented a new and useful Three-Horse Evener, of which the following is a specification.

The object of this invention is to provide a three-horse draft-equalizer of simple, cheap, strong, and durable construction that may be readily, quickly, and easily adjusted to conform to the relative strength of the draft-animals placed on opposite sides of the tongue.

A further object is to provide an equalizer of this class in which the side draft is minimized, and a further object is to provide a three-horse equalizer in which upon the event of the team on one side of the tongue or the draft-animal on the other side pulling less than their amount of the load the whiffletree to which they are attached will be forced to the rear and the tongue and front trucks turned laterally to a slight degree, so that the driver may at once note any diminution in the power applied by either the team or the single animal.

My invention consists in certain details in the construction, arrangement, and combination of the draft-equalizing levers and accompanying parts, as hereinafter set forth, pointed out in my claims, and illustrated in the accompanying drawing, which shows in perspective a complete equalizer applied to a tongue-section.

Referring to the accompanying drawing, the reference-numeral 10 is used to indicate the tongue, which, it is to be understood, is connected with hounds of the front truck in the usual way. On the top of the tongue a plate 11 is fixed, and the numeral 12 is used to indicate a flat bar with its forward end held to the plate by means of a pin 13, which is extended through the said bar, through the plate 11, and the tongue 10. The rear end of the said plate 12 is fixed to the forward truck of the wagon in the usual manner, and a pin 13$^a$ is passed through this bar near its rear end.

The reference-numeral 14 is used to indicate a one-horse equalizing-lever having at one end a series of openings 15, whereby a singletree 16 may be adjustably connected thereto. At a point approximating two-thirds of the length of this lever the pin 13 is passed through it with the bar 12 above it and the plate 11 under it, thus providing for the pivotal connection of this lever with the tongue. The opposite end of the lever, which projects to the opposite side of the tongue, is bifurcated at 17.

The reference-numeral 18 is used to indicate a double equalizing-lever having its one end admitted in the bifurcated end of the lever 14 and held therein by a pivot 19. At the outer end of this lever 18 is a series of holes 20, whereby a doubletree 21 may be adjustably connected therewith.

The reference-numeral 22 is used to indicate an equalizing-lever extended between the plate 11 and the bar 12, so that it may be slidingly mounted on the tongue, and having in each end a series of openings 23. Approximately two-thirds of this lever 22 is located on the same side of the tongue as the doubletree 21, and a pin 13$^a$ passes through it.

The reference-numeral 24 indicates links pivoted in one of the openings 23 at the long end of the lever 22 and also in the openings 25, which same are formed in the approximate central portion of the double equalizer 18.

The reference-numeral 26 is used to indicate links corresponding in length and shape with the links 24 and pivoted at one end in one of the openings 23 and at the other end in one of a series of openings 27, which same are formed in the single equalizing-lever 14 at a point midway between its pivotal point at the point where the singletree 16 is connected thereto.

To illustrate the practical operation of this device, we will assume that to each of the singletrees a direct pull of twenty-five pounds is applied. One hundred pounds on the long lever 22 requires three hundred and thirty-three and one-third pounds on the short end to balance it. Now the two horses on one end of the lever 18, drawing twenty-five pounds each, draw the one hundred pounds on lever 22 as the other end of the lever 14 at the joint or pivot-point connecting levers 14 and 18. This rearward fifty pounds being twice the distance from pivot on tongue that the pivot is on the other side, it draws one hundred pounds of the three hundred and thirty-three and one-third pounds on short end of lever 22. Hence the two horses draw but twenty-five pounds each and are at the same time drawing one hundred pounds for the single horse on the other side of tongue. The lever 18 is made long enough so that the twenty-five pounds on the outer end will balance two hundred and thirty-three and one-third pounds at its inner end, making an equal number of pounds for each horse. Both of the connecting-links slope the same, the front end of each link being nearer the tongue than the back end of the link, thus doing away with side draft.

Having thus described my invention, what I claim as new therein, and desire to secure by Letters Patent of the United States therefor, is—

1. A draft-equalizer comprising in combination, a lever 14 pivoted to the tongue near one end, a lever 18 having one end pivoted to the end of lever 14, and an equalizing-bar 22 pivoted to the tongue and also pivotally connected with levers 14 and 18, substantially as set forth.

2. A three-horse draft-equalizer, comprising in combination, a tongue, a single equalizing-lever 14 pivoted to the tongue with its ends projecting on opposite sides of the tongue, a lever 18 pivoted to the lever 14, means at the outer ends of said lever for attaching whiffletrees thereto, an equalizing-lever 22 slidingly mounted on top of the tongue, and connecting-links 24 and 26 pivoted to the levers 14 and 18 in substantially the position shown, all arranged and combined substantially in the manner set forth and for the purposes stated.

ROBERT C. HARRIS.

Witnesses:
L. C. BOLTON,
E. H. WARING.